United States Patent
Solondz et al.

(10) Patent No.: US 11,064,416 B2
(45) Date of Patent: Jul. 13, 2021

(54) MOBILITY MANAGEMENT FOR AIRBORNE MOBILE DEVICES

(71) Applicant: Verizon Patent and Licensing Inc., Arlington, VA (US)

(72) Inventors: Max A. Solondz, New Vernon, NJ (US); Frank Jager, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 74 days.

(21) Appl. No.: 16/248,052

(22) Filed: Jan. 15, 2019

(65) Prior Publication Data

US 2020/0229060 A1    Jul. 16, 2020

(51) Int. Cl.
*H04W 36/30* (2009.01)
*H04W 36/00* (2009.01)
*H04B 7/185* (2006.01)
*H04W 36/08* (2009.01)
*H04W 36/14* (2009.01)

(52) U.S. Cl.
CPC ...... *H04W 36/305* (2018.08); *H04B 7/18504* (2013.01); *H04W 36/0009* (2018.08); *H04W 36/08* (2013.01); *H04W 36/14* (2013.01)

(58) Field of Classification Search
CPC ........... H04W 36/305; H04W 36/0009; H04W 36/08; H04W 36/14; H04W 7/18504; H04B 7/18504
See application file for complete search history.

(56) References Cited

U.S. PATENT DOCUMENTS

2005/0259663 A1* 11/2005 Ode .................... G03C 7/39296
370/395.4
2006/0276201 A1* 12/2006 Dupray .................. H04L 67/18
455/456.1
2010/0069070 A1* 3/2010 Shi ........................ H04W 36/32
455/436

* cited by examiner

*Primary Examiner* — Jianye Wu (57) ABSTRACT

A radio access network (RAN) mobility management element can receive a satellite-based measurement of a geolocation of an airborne mobile device. The RAN mobility management element can determine, based on the satellite-based measurement, a distance between the geolocation of the airborne mobile device and a geolocation of a serving cell that is serving the airborne mobile device, and a respective distance between the geolocation of the airborne mobile device and a respective geolocation of each cell of a plurality of cells. The RAN mobility management element can determine whether to hand over the airborne mobile device to a cell, included in the plurality of cells, based on the distance between the geolocation of the airborne mobile device and the geolocation of the serving cell, and a distance between the geolocation of the airborne mobile device and a geolocation of the cell included in the plurality of cells.

20 Claims, 8 Drawing Sheets

MOBILITY MANAGEMENT FOR AIRBORNE MOBILE DEVICES

BACKGROUND

Airborne mobile devices, such as drones, unmanned aerial vehicles (UAVs), and/or the like, are often capable of communicating with a wireless telecommunications network via a wireless communication link. An airborne mobile device can be controlled via the wireless communication link, and can provide, via the wireless communication link, media that is generated by the airborne mobile device (e.g., a video feed, recorded video, captured images, and/or the like). and/or the like.

DETAILED DESCRIPTION OF PREFERRED EMBODIMENTS

The following detailed description of example implementations refers to the accompanying drawings. The same reference numbers in different drawings can identify the same or similar elements.

A wireless telecommunications network can provide service to an airborne mobile device through a number of serving cells that cover an area. In some cases, as the airborne mobile device moves throughout the wireless telecommunications network, the airborne mobile device can travel into an adjacent coverage area of another cell near the original serving cell. As a result, the other cell and the original serving cell can agree to hand over the airborne mobile device to the other cell so that the other cell can subsequently become the serving cell for the airborne mobile device.

In some cases, the determination of whether to hand over an airborne mobile device from a serving cell to another cell can be based on signal strength measurements, similarly to how current mobility networks now handle mobile devices that operate near ground level. Typically, relative signal strength measurements and determinations, either at the base station (uplink signal measurements) or at the mobile (handset) station (downlink signal measurements) can be used to determine which cell has the best coverage (strongest signal strength) to we serve that mobile station. For example, the airborne mobile device can perform a signal strength measurement for the wireless communication link between the airborne mobile device and the serving cell, as well as a signal strength measurement for the wireless communication link between the airborne mobile device and the other cell. The serving cell, the other cell, and/or another controlling element included in the wireless telecommunications network can determine to hand over the airborne mobile device from the original serving cell to the other cell based. This decision is based on the signal strength measurement for the wireless communication link between the airborne mobile device and the other cell being greater than the signal strength measurement for the wireless communication link between the airborne mobile device and the original serving cell.

However, since the airborne mobile device operates in the air, the airborne mobile device can operate at a height above local clutter (e.g., buildings, trees, differences in terrain, and/or any other physical obstructions). As a result, unlike typical terrestrial handsets, the airborne mobile device can experience high signal strength levels from many nearby cells (e.g., 10-30 cells or more) due to the line of sight conditions and the lack of signal attenuation from local clutter. This can cause handover decisions to occur too late (e.g., such as when the serving cell cannot determine when the signal strength has diminished to a point where the handover should occur), can cause erroneous or inefficient handover decisions (e.g., the serving cell cannot determine which cell to hand over the airborne mobile device to, due to signal strength measurements being similar for nearby cells), or the determination of too many possible other cells as candidate handover cells.

Some implementations described herein provide a radio access network (RAN) mobility management element that is capable of performing mobility management for airborne mobile devices. In some implementations, the RAN mobility management element is capable of making handover determinations, for an airborne mobile device, based on satellite-based measurements of a geolocation of the airborne mobile device. In particular, the RAN mobility management device can determine whether to hand over the airborne mobile device from a serving cell to another cell, can identify one or more candidate handover cells, and/or the like, based on a distance between the airborne mobile device and the serving cell and a distance between the airborne mobile device and the one or more candidate handover cells (e.g., which can be determined based on the satellite-based measurements). In some implementations, the RAN mobility management device can further supplement the determination based on signal strength measurements, signal quality measurements, interference measurements, and/or the like.

Since the airborne mobile device can operate at a height above local clutter, unlike a typical terrestrial handset, the airborne mobile device can have an unobstructed line-of-sight of a plurality of GPS positioning satellites that can be used to perform the satellite-based location determination measurements. Moreover, since networks and handover procedures typically depend on the local clutter to provide some signal attenuation, which helps to bound the coverage area of a cell, and which helps to limit the number of identified handover candidate cells, the proposed RAN mobility management element can perform more predictable, more accurate, and less resource-intensive handover determinations, using satellite-based measurements of geolocation when the airborne mobile device is operating above the local clutter, compared to handover determinations that are based on signal strength measurements alone. In addition, basing handover determinations on satellite-based measurements of geolocation can allow airborne mobile devices to operate at lower power levels, which in turn can result in less uplink interference in the wireless telecommunications network compared to handover determinations based on signal strength alone.

FIGS. 1A-1E are diagrams of an example implementation 100 described herein. As shown in FIGS. 1A-1E, implementation 100 can include various components, elements, and/or devices, such as an airborne mobile device, a plurality of positioning satellites (collectively referred to as "positioning satellites" and individually as "positioning satellite"), a plurality of cells (e.g., cell 1 through cell n, collectively referred to as "cells" and individually as "cell"), a radio access network (RAN) mobility management element, and/or the like. In some implementations, the airborne mobile device, the plurality of cells, and the RAN mobility management element can be included in a wireless telecommunications network.

In some implementations, the airborne mobile device can include various types of mobile devices that are intended to travel in the air above ground level as opposed to at or near ground level. These types of mobile devices can include drones, UAVs, manned aircraft, and/or the like. The airborne mobile device can include one or more components that permit the airborne mobile device to wirelessly communicate with the cells included in the RAN of the wireless telecommunications system, can include one or more components that permit the airborne mobile device to wirelessly receive information from the positioning satellites, and/or the like.

In some implementations, the plurality of cells, and the RAN mobility management element can be included in a radio access network (RAN) of the wireless telecommunications network. In some implementations, the airborne mobile device can communicatively connect, via a cell included in the RAN, with the wireless telecommunications network when the mobile device is located within a coverage area of the cell. In some implementations, coverage areas of a subset of the cells can at least partially overlap (e.g., the coverage area of cell 1 can at least partially overlap with the coverage area of cell 2, the coverage area of cell 2 can at least partially overlap with the coverage area of cell n, and/or the like). As the airborne mobile device moves from a coverage area of a first cell (e.g., cell 2) to a coverage area of a second cell (e.g., cell 1), cell 2 can hand over the airborne mobile device to cell 1 (e.g., so that the airborne mobile device is transitioned from being served by cell 2 to being served by cell 1) while the airborne mobile device is in an overlapping portion of the coverage area of cell 2 and the coverage area of cell 1.

In some implementations, the RAN mobility management element can receive various types of information associated with the airborne mobile device, in order to determine whether a handover of the airborne mobile device, between a first cell and a second cell, is to be initiated, that are configured to identify one or more candidate cells for the handover, that are configured to provide an instruction to one or more cells to initiate a handover, and/or the like. In some implementations, the information, associated with the airborne mobile device, can include information identifying one or more satellite-based measurements of a geolocation of the airborne mobile device, information identifying one or more signal measurements associated with wireless communication links between the airborne mobile device and the cells (e.g., a signal strength measurement, a signal quality measurement, an interference measurement, and/or the like).

Figure 1A:
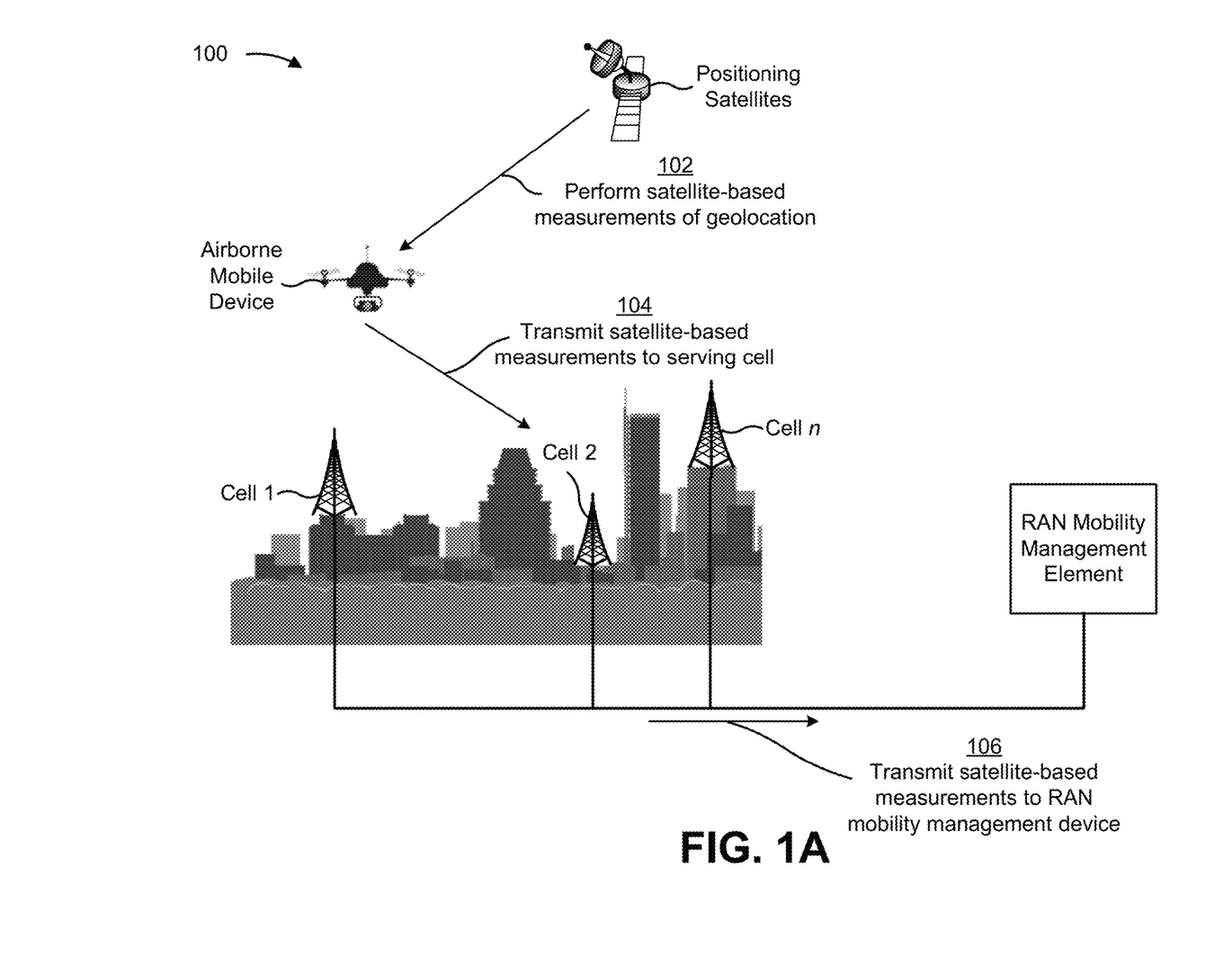
FIGS. 1A-1E are diagrams of an example implementation described herein.

As shown in FIG. 1A, and by reference number 102, the airborne mobile device can generate the information associated with the airborne mobile device by performing the one or more satellite-based measurements of a geolocation of the airborne mobile device. In some implementations, the airborne mobile device can periodically perform a satellite-based measurement based on a specified time interval (e.g., specified by a cell, specified by the RAN mobility management element, and/or the like), can perform a satellite-based measurement based on receiving a request to perform the satellite-based measurement (e.g., from a cell, from the RAN mobility management element, and/or the like), and/or the like. In some implementations, the airborne mobile device can perform a plurality of satellite-based measurements as the airborne mobile device moves throughout the air, which can permit the geolocation of the airborne mobile device to be tracked as the geolocation of the airborne mobile device changes.

In some implementations, the airborne mobile device can perform a satellite-based measurement of the geolocation of the airborne mobile device by receiving information from the positioning satellites. For example, the positioning satellites can include global positioning system (GPS) satellites that each transmit positioning information (e.g., information identifying a position of the positioning satellite), timestamp information (e.g., information identifying a time at which the positioning information was transmitted), and/or the like. The airborne mobile device can receive the timestamp information and positioning information from the positioning satellites and can perform the satellite-based measurement of the geolocation based on the timestamp information and the positioning information (e.g., by performing trilateration based on the timestamp information and the positioning information, by performing triangulation based on the timestamp information and the positioning information, and/or the like). In some implementations, the satellite-based measurement of the geolocation of the airborne mobile device can include a measurement of the longitude of the airborne mobile device, the latitude of the airborne mobile device, the altitude of the airborne mobile device, a date and time at which the satellite-based measurement was performed, and/or the like.

Moreover, in some implementations, the airborne mobile device can generate the information associated with the airborne mobile device by performing the one or more signal measurements associated with the wireless communication links between the airborne mobile device and the cells. In some implementations, the airborne mobile device can periodically perform a signal measurement based on a specified time interval (e.g., specified by a cell, specified by the RAN mobility management element, and/or the like), can perform a signal measurement based on receiving a request to perform the signal measurement (e.g., from a cell, from the RAN mobility management element, and/or the like), and/or the like. In some implementations, the airborne mobile device can perform a plurality of signal measurements as the airborne mobile device moves through the air, which can permit signal measurements to be performed as the geolocation of the airborne mobile device changes.

In some implementations, the airborne mobile device can perform the one or more signal measurements by performing, for a particular cell, a signal-to-interference-plus-noise ratio (SINR) measurement, a reference signal received power (RSRP) measurement, received signal strength indicator (RSSI) measurement, reference signal received quality (RSRQ) measurement, channel quality indicator (CQI) measurement, and/or the like.

As further shown in FIG. 1A, and by reference number 104, the airborne mobile device can transmit, to a serving cell, information identifying the one or more satellite-based measurements of the geolocation of the airborne mobile device. The serving cell can be a cell that is serving the airborne mobile device, which in the example illustrated in FIG. 1A can be Cell 2. In some implementations, the airborne mobile device can also transmit information identifying the one or more signal measurements to the respective cells. For example, the airborne mobile device can transmit information identifying one or more signal measurements, associated with Cell 1, to Cell 1; can transmit information identifying one or more signal measurements, associated with Cell 2, to Cell 2; and/or the like.

In some implementations, the airborne mobile device can transmit information identifying a satellite-based measurement based on performing the satellite-based measurement, based on receiving a request for the information identifying satellite-based measurement (e.g., from the serving cell, from the RAN mobility management element, and/or the like), and/or the like. Similarly, the airborne mobile device can transmit information identifying a signal measurement based on performing the signal measurement, based on receiving a request for the information identifying signal measurement (e.g., from a cell, from the RAN mobility management element, and/or the like), and/or the like.

As further shown in FIG. 1A, and by reference number 106, the serving cell can transmit, to the RAN mobility management element, the information identifying one or more satellite-based measurements of the geolocation of the airborne mobile device (e.g., based on receiving the information identifying one or more satellite-based measurements, based on receiving a request for the information identifying one or more satellite-based measurements from the RAN mobility management element, and/or the like). Moreover, the serving cell and the other cells included in the plurality of cells can transmit the information identifying one or more signal measurements based on receiving the information identifying one or more signal measurements, based on receiving a request for the information identifying one or more signal measurements from the RAN mobility management element, and/or the like.

Figure 1B:
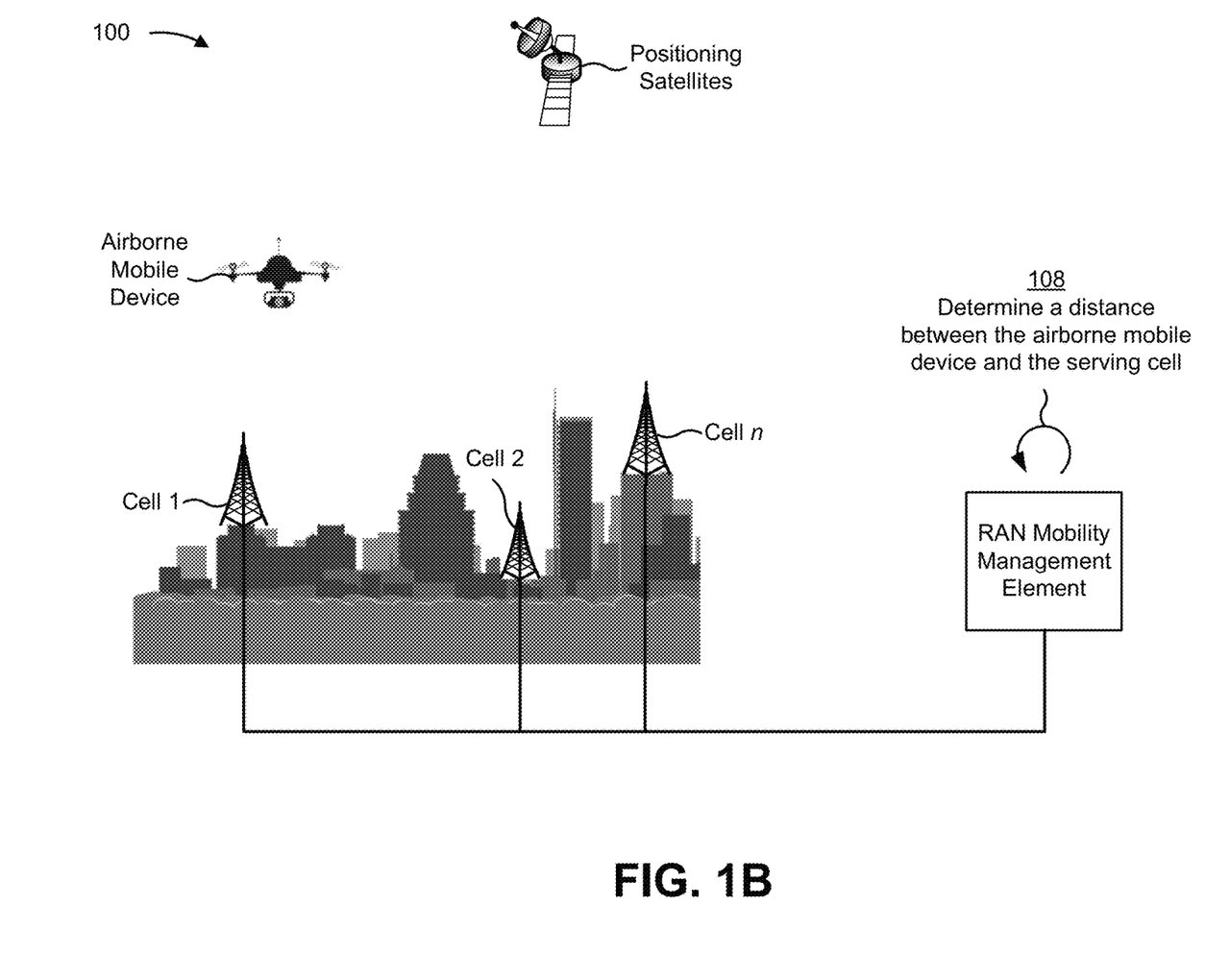

As shown in FIG. 1B, and by reference number 108, the RAN mobility management element can determine a distance between the airborne mobile device and the serving cell. For example, the RAN mobility management element can determine the distance between the geolocation of the airborne mobile device and a geolocation of the serving cell based on a satellite-based measurement of the geolocation of the airborne device. In some implementations, the RAN mobility management element can receive, from the serving cell, information identifying the geolocation of the serving cell, can perform a lookup in a data structure (e.g., a table, an electronic file, a database, and/or the like) to identify the geolocation of the serving cell, and/or the like.

In some implementations, the RAN mobility management element can determine the distance between the geolocation of the airborne mobile device and the geolocation of the serving cell by determining a difference in latitudes of the geolocation of the airborne mobile device and the geolocation of the serving cell, by determining a difference in longitudes of the geolocation of the airborne mobile device and the geolocation of the serving cell, by determining a difference in altitudes of the geolocation of the airborne mobile device and the geolocation of the serving cell, and/or the like. In some implementations, the RAN mobility management element can determine the distance between the geolocation of the airborne mobile device and the geolocation of the serving cell based on a combination of the difference in latitudes of the geolocation of the airborne mobile device and the geolocation of the serving cell, the difference in longitudes of the geolocation of the airborne mobile device and the geolocation of the serving cell, and the difference in altitudes of the geolocation of the airborne mobile device and the geolocation of the serving cell.

In some implementations, the RAN mobility management element can determine changes in the distance between the geolocation of the airborne mobile device and the geolocation of the serving cell based on a plurality of satellite-based measurements of the geolocation of the airborne device. In this way, the RAN mobility management element can determine whether the airborne mobile device is moving toward the serving cell (which can be indicated by the distance between the geolocation of the airborne mobile device and the geolocation of the serving cell becoming smaller over time), can determine whether the airborne mobile device is moving away the serving cell (which can be indicated by the distance between the geolocation of the airborne mobile device and the geolocation of the serving cell becoming greater over time), can determine a speed of travel at which the airborne mobile device is moving toward or away from the serving cell, and/or the like.

Figure 1C:
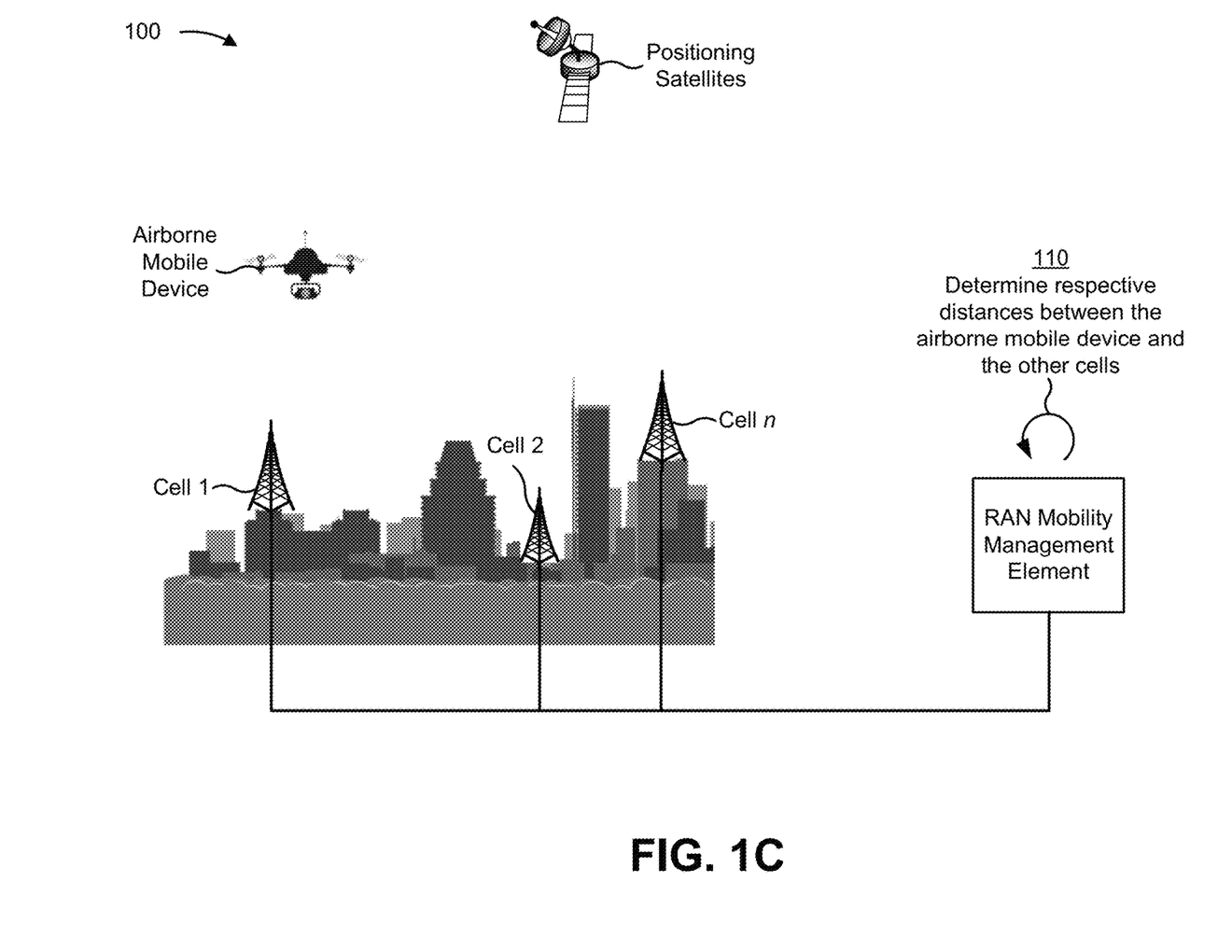

As shown in FIG. 1C, and by reference number 110, the RAN mobility management element can determine respective distances between the airborne mobile device and the other cells included in the plurality of cells. For example, the RAN mobility management element can determine the respective distances between the geolocation of the airborne mobile device and respective geolocations of the other cells (which can be provided by the other cells, can be looked up in a data structure, and/or the like). In some implementations, the RAN mobility management element can determine the respective distances between the geolocation of the airborne mobile device and respective geolocations of the other cells in a manner that is similar to determining the distance between the geolocation of the airborne mobile device and the geolocation of the serving cell, as described above.

In some implementations, the RAN mobility management element can determine changes in the respective distances between the geolocation of the airborne mobile device and the respective geolocations of the other cells. For example, the RAN mobility management element can determine the changes in the respective distances between the geolocation of the airborne mobile device and the respective geolocations of the other cells in a manner that is similar to determining the changes in the distance between the geolocation of the airborne mobile device and the geolocation of the serving cell, as described above. In this way, the RAN mobility management element can determine whether the airborne mobile device is moving toward one or more of the other cells, can determine whether the airborne mobile device is moving away from one or more of the other cells, can determine a speed of travel at which the airborne mobile device is moving toward or away from one or more of the other cells, and/or the like.

Figure 1D:
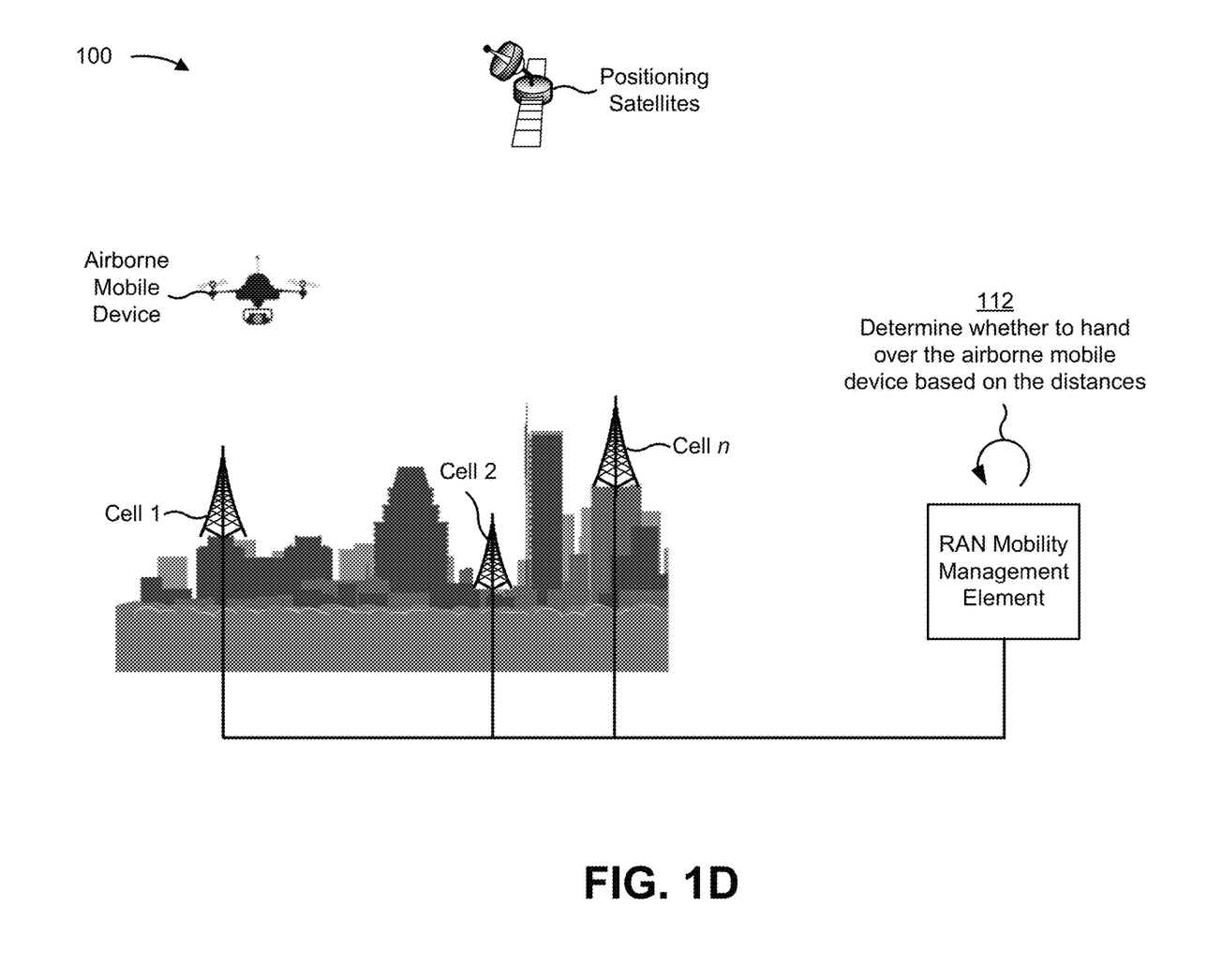

As shown in FIG. 1D, and by reference number 112, the RAN mobility management element can determine whether to hand over the airborne mobile device from the serving cell to another cell included in the plurality of cells. In some implementations, the RAN mobility management element can determine whether to hand over the airborne mobile device based on the distance between the geolocation of the airborne mobile device and the geolocation of the serving cell and the respective distances between the geolocation of the airborne mobile device and the respective geolocations of the other cells. For example, the RAN mobility management element can determine whether any of the respective distances are less than the distance between the geolocation of the airborne mobile device and the geolocation of the serving cell. The RAN mobility management element can determine to hand over the airborne mobile device to a cell whose respective distance is less than the distance between the geolocation of the airborne mobile device and the geolocation of the serving cell.

In some implementations, the RAN mobility management element can supplement the determination of whether to hand over the airborne mobile device with other information, such as the direction of movement of the airborne mobile device, the speed of movement of the airborne mobile device, the one or more signal measurements performed by the airborne mobile device, and/or the like.

For example, the RAN mobility management element can determine to hand over the airborne device from the serving cell to another cell based on a respective distance between the geolocation of the airborne mobile device and the geolocation of the other cell being less than the distance between the geolocation of the airborne mobile device and the geolocation of the serving cell, and based on determining that the airborne mobile device is moving toward the other cell and away from the serving cell. As another example, the RAN mobility management element can determine that a respective distance between the geolocation of the airborne mobile device and the geolocation of the other cell is less than the distance between the geolocation of the airborne mobile device and the geolocation of the serving cell, but can determine not to hand over the airborne device from the serving cell to the other cell based on determining that the airborne mobile device is moving away from other cell. As another example, the RAN mobility management element can determine that a respective distance between the geolocation of the airborne mobile device and the geolocation of the other cell is less than the distance between the geolocation of the airborne mobile device and the geolocation of the serving cell, but can determine not to hand over the airborne device from the serving cell to the other cell based on determining that the airborne mobile device is moving in a direction that will cause the wireless communication link between the airborne mobile device and the other cell to become obstructed (e.g., due to the airborne mobile device moving behind a building or other local clutter).

As another example, the RAN mobility management element can determine to hand over the airborne device from the serving cell to another cell based on a respective distance between the geolocation of the airborne mobile device and the geolocation of the other cell being less than the distance between the geolocation of the airborne mobile device and the geolocation of the serving cell, and based on determining that the one or more signal measurements for the other cell satisfy one or more signal measurement thresholds. As another example, the RAN mobility management element can determine that a respective distance between the geolocation of the airborne mobile device and the geolocation of the other cell is less than the distance between the geolocation of the airborne mobile device and the geolocation of the serving cell, but can determine not to hand over the airborne device from the serving cell to the other cell based on determining that the one or more signal measurements for the other cell do not satisfy one or more signal measurement thresholds (e.g., due to the airborne mobile device being located outside of a lobe of an antenna associated with the cell, due to the airborne mobile device being located behind local clutter, and/or the like).

As another example, the RAN mobility management element can determine that a respective distance between the geolocation of the airborne mobile device and a geolocation of another cell is less than the distance between the geolocation of the airborne mobile device and the geolocation of the serving cell, but can determine to not to hand over the airborne device from the serving cell to the cell based on based on a speed of movement of the airborne mobile device (e.g., based on the RAN mobility management element determining that the airborne mobile device can travel out of the coverage area of the other cell by the time the handover is completed).

In some implementations, the RAN mobility management element can limit the quantity of cells that are compared to the serving cell to reduce the processing resources, memory resources, and/or network resources that are used to perform the handover determination. For example, the RAN mobility management element can compare cells that are within a threshold distance (e.g., 1 mile, 2 kilometers, and/or the like) of the serving cell, within a threshold distance of the airborne mobile device, that are adjacent to the serving cell, and/or the like, and can monitor the cells as part of a list of candidate handover cells.

Figure 1E:
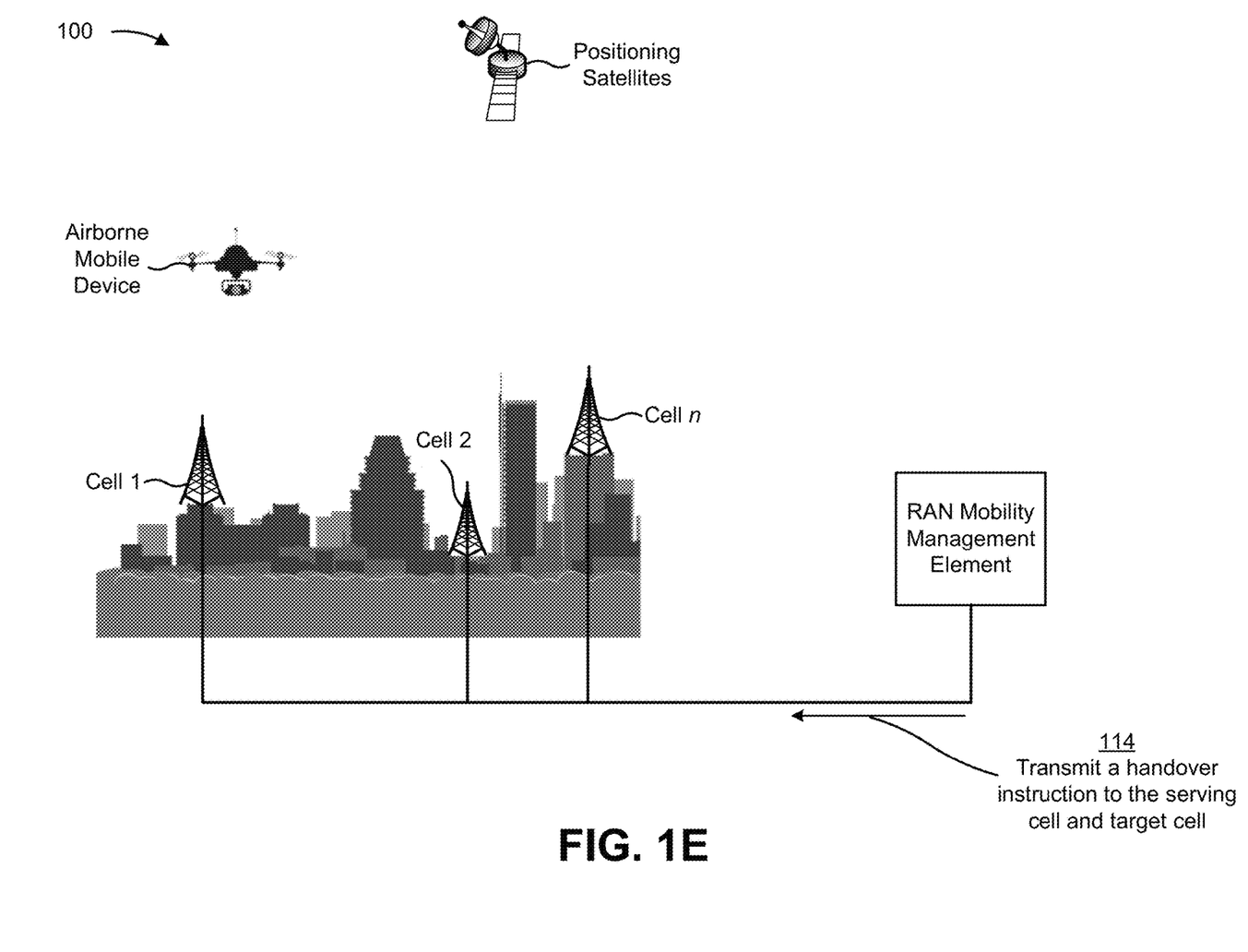

As shown in FIG. 1E, and by reference number 114, if the RAN mobility management element determines to hand over the airborne mobile device from the serving cell to another cell included in the plurality of cells (e.g., Cell 1), the RAN mobility management element can transmit a handover instruction to the serving cell and the other cell (which can be referred to as a target cell). The serving cell and the other cell can receive the instruction, and can coordinate the handover of the airborne mobile device to the other cell.

In this way, the RAN mobility management element can perform handover determinations, for the airborne mobile device, based on satellite-based measurements of a geolocation of the airborne mobile device. Since the airborne mobile device can operate at a height above local clutter, the airborne mobile device can have an unobstructed view of the positioning satellites that can be used to perform the satellite-based measurements. Moreover, since signal strength measurements typically depend on the local clutter to provide some signal attenuation, which helps to bound the coverage area of a cell, the RAN mobility management can perform more predictable, more accurate, and less resource-intensive handover determinations, using satellite-based measurements of geolocation when the airborne mobile device is operating above the local clutter, compared to handover determinations that are based on signal strength measurements. In addition, basing handover determinations using satellite-based measurements of geolocation can allow airborne mobile devices to operate at lower power levels, which in turn can result in less uplink interference in the wireless telecommunications network compared to handover determinations based on signal strength.

As indicated above, FIGS. 1A-1E are provided merely as an example. Other examples can differ from what is described with regard to FIGS. 1A-1E.

Figure 2:
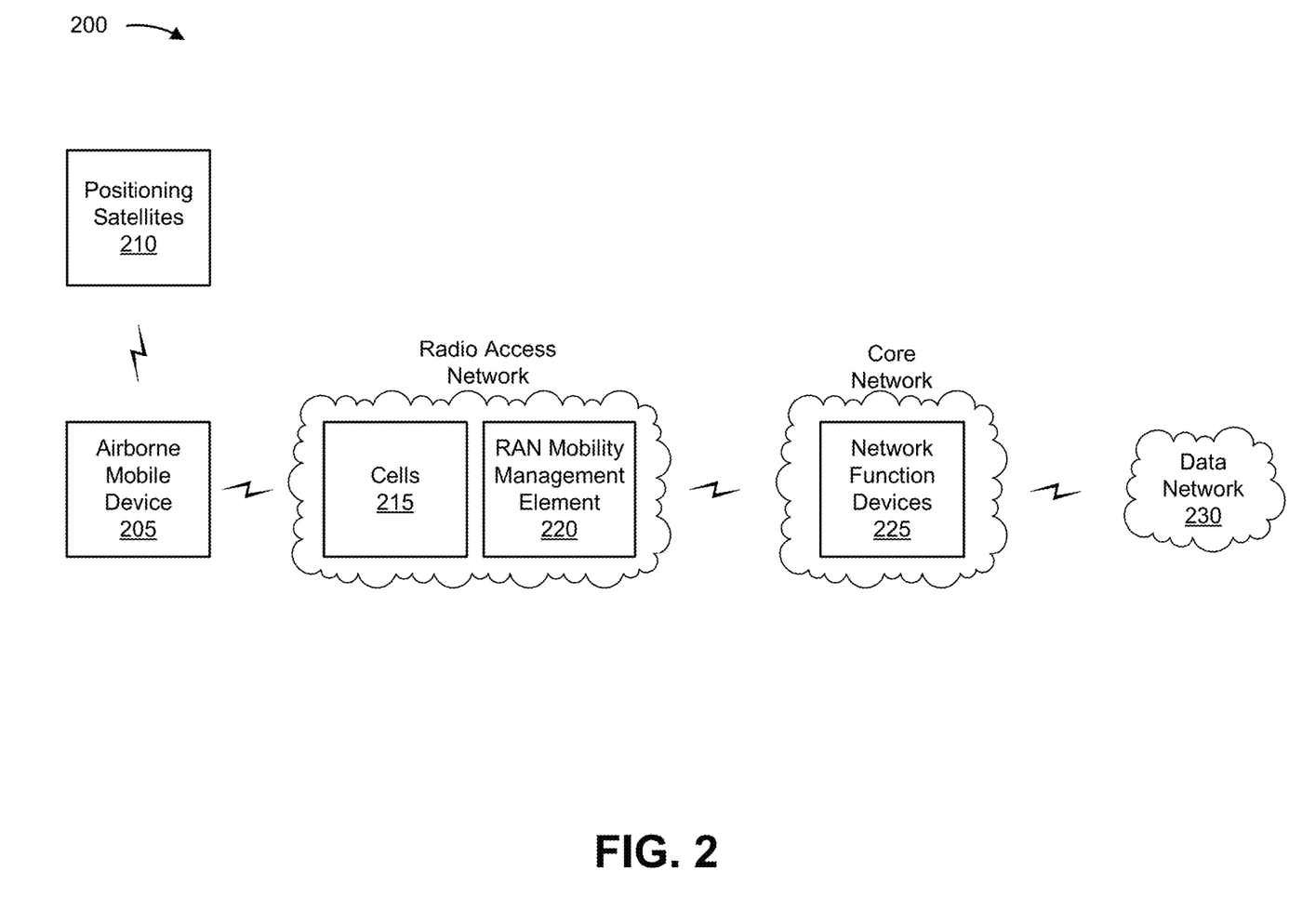
FIG. 2 is a diagram of an example environment in which systems and/or methods described herein can be implemented.

FIG. 2 is a diagram of an example environment 200 in which systems and/or methods described herein can be implemented. As shown in FIG. 2, environment 200 can include an airborne mobile device 205, a plurality of positioning satellites 210 (collectively referred to as "positioning satellites 210" and individually as "positioning satellite 210"), a plurality of cells 215 (collectively referred to as "cell 215" and individually as "cell 215"), a RAN mobility management element 220, a plurality of network function devices 225 (collectively referred to as "network function devices 225" and individually as "network function device 225"), and a data network 230. Devices of environment 200 can interconnect via wired connections, wireless connections, or a combination of wired and wireless connections. Some implementations can be performed within a wireless telecommunications network, such as a 4G network, a long term evolution (LTE) network, a 5G network, and/or the like.

Environment 200 can include a radio access network (RAN), such as an LTE RAN, a 5G next generation RAN (NG-RAN), and/or the like. The RAN can include cells 215 with which airborne mobile device 205 communicates via a wireless communication link, as well as RAN mobility management element 220. The RAN can provide connectivity to a core network of environment 200. The core network can include an LTE evolved packet core (EPC), a 5G next generation core network (NG Core), and/or the like. The core network can include network function devices 225 that enable airborne mobile device 205 to communicate with data network 230.

Airborne mobile device 205 includes one or more devices capable of air travel, capable of communicating with cells 215 and/or a network (e.g., data network 230), and capable of receiving information from positioning satellites 210. For example, airborne mobile device 205 can include a drone, a UAV, a manned aircraft, and/or the like. In some implementations, airborne mobile device 205 can receive, from positioning satellites 210, positioning information, location information associated with positioning satellites 210, and/or the like. In some implementations, airborne mobile device 205 can perform one or more satellite-based measurements of a geolocation of airborne mobile device 205 based on the information received from positioning satellites 210, can perform one or more signal measurements for a wireless communication link between airborne mobile device 205 and a cell 215, and/or the like.

Positioning satellites 210 include one or more devices capable of transmitting timestamp information, location information, and/or the like. For example, positioning satellites 210 can include a GPS satellite, a Global Navigation Satellite System (GLONASS) satellite, a Galileo satellite, and/or the like, that is included in a global navigation satellite system (GNSS).

Cells 215 include one or more devices capable of transferring traffic destined for and/or received from airborne mobile device 205. In some implementations, cells 215 can receive traffic from and/or send traffic to data network 230 via one or more network function devices 225 and/or the like. Cells 215 can send traffic to and/or receive traffic from airborne mobile device 205 via a wireless communication link. In some implementations, cells 215 can include one or more small cell base stations, such as a base station of a microcell, a picocell, and/or a femtocell; one or more macrocell base stations, such as an evolved NodeB (eNodeB), a next generation NodeB (gNodeB), and/or the like.

RAN mobility management element 220 includes one or more devices capable of performing mobility management for airborne mobile device 205. For example, RAN mobility management element 220 can receive one or more satellite-based measurements of a geolocation of airborne mobile device 205, can determine respective distances between the geolocation of airborne mobile device 205 and respective geolocations of cells 215, can determine whether to hand over airborne mobile device 205 based on the respective distances, and can provide a handover instruction to one or more cells 215. In some implementations, RAN mobility management element 220 can supplement the handover determination based on one or more signal measurements performed by airborne mobile device 205.

Network function devices 225 include one or more devices capable of communicating with airborne mobile device 205, with cells 215, with data network 230, and/or the like. In some implementations, network function devices 225 can include a user plane function (UPF) device, a session management function (SMF) device, an access and mobility management function (AMF) device, a policy control function (PCF) device, and/or the like. In some implementations, network function devices 225 can be implemented on physical devices, such as a gateway, a mobility management entity, and/or the like.

The UPF device can communicatively connect cells 215 (and therefore airborne mobile device 205) to data networks 230. The UPF device can receive one or more packets from airborne mobile device 205, can apply one or more rules to the one or more packets to process the one or more packets, can transmit the packets to data network 230, and/or the like. The SMF device can establish, modify, and/or terminate a data session for airborne mobile device 205. For example, the SMF device can assign a network address to airborne mobile device 205 during establishment of the data session, can release the network address from airborne mobile device 205 during termination of the data session, and/or the like. The AMF device can manage the registration of airborne mobile device 205 with cells 215, can monitor the location of airborne mobile device 205, can manage the reachability of airborne mobile device 205, and/or the like.

The PCF device can generate one or more rules for the data session associated with airborne mobile device 205. The one or more rules can include one or more mobility management rules (e.g., a service continuity rule, such as a rule that controls how packets are handled when a network address changes during the data session, a data session continuity rule, such as a rule that controls how the data session is to be maintained based on the mobility of airborne mobile device 205, and/or the like), and/or the like.

In some implementations, the hardware and/or software implementing network function devices 225 can be virtualized (e.g., through the use of network function virtualization and/or software-defined networking), thereby allowing for the use of composable infrastructure when implementing network function devices 225. In this way, networking, storage, and compute resources can be allocated to implement the network slicing in a flexible manner, as opposed to relying on dedicated hardware and software to implement these functions.

Data network 230 can include one or more wired and/or wireless networks. For example, data network 230 can include a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
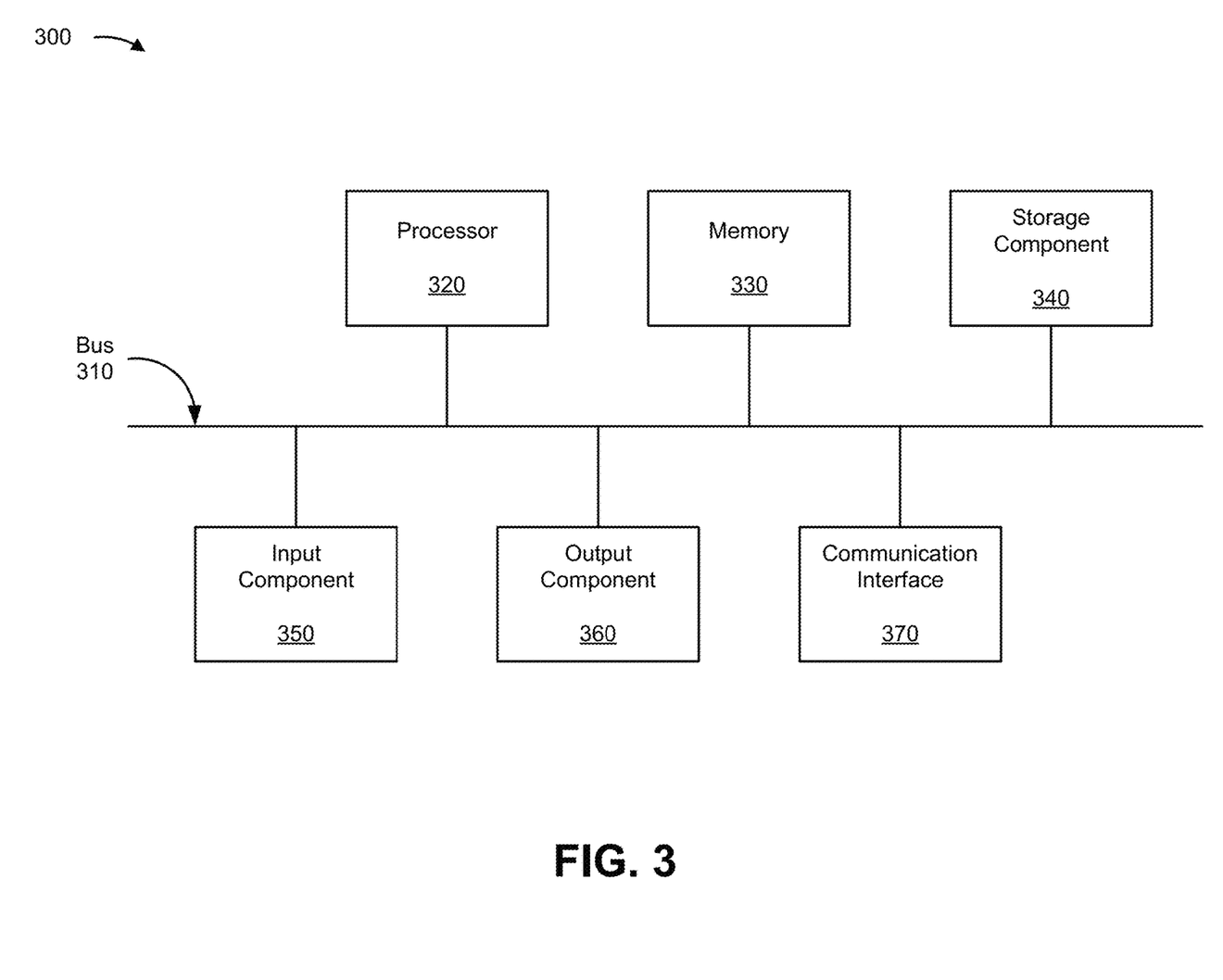
FIG. 3 is a diagram of example components of one or more devices of FIG. 2.

FIG. 3 is a diagram of example components of a device 300. Device 300 can correspond to airborne mobile device 205, positioning satellite 210, cells 215, RAN mobility management element 220, network function devices 225, and/or one or more devices included in data network 230. In some implementations airborne mobile device 205, positioning satellite 210, cells 215, RAN mobility management element 220, network function devices 225, and/or one or more devices included in data network 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
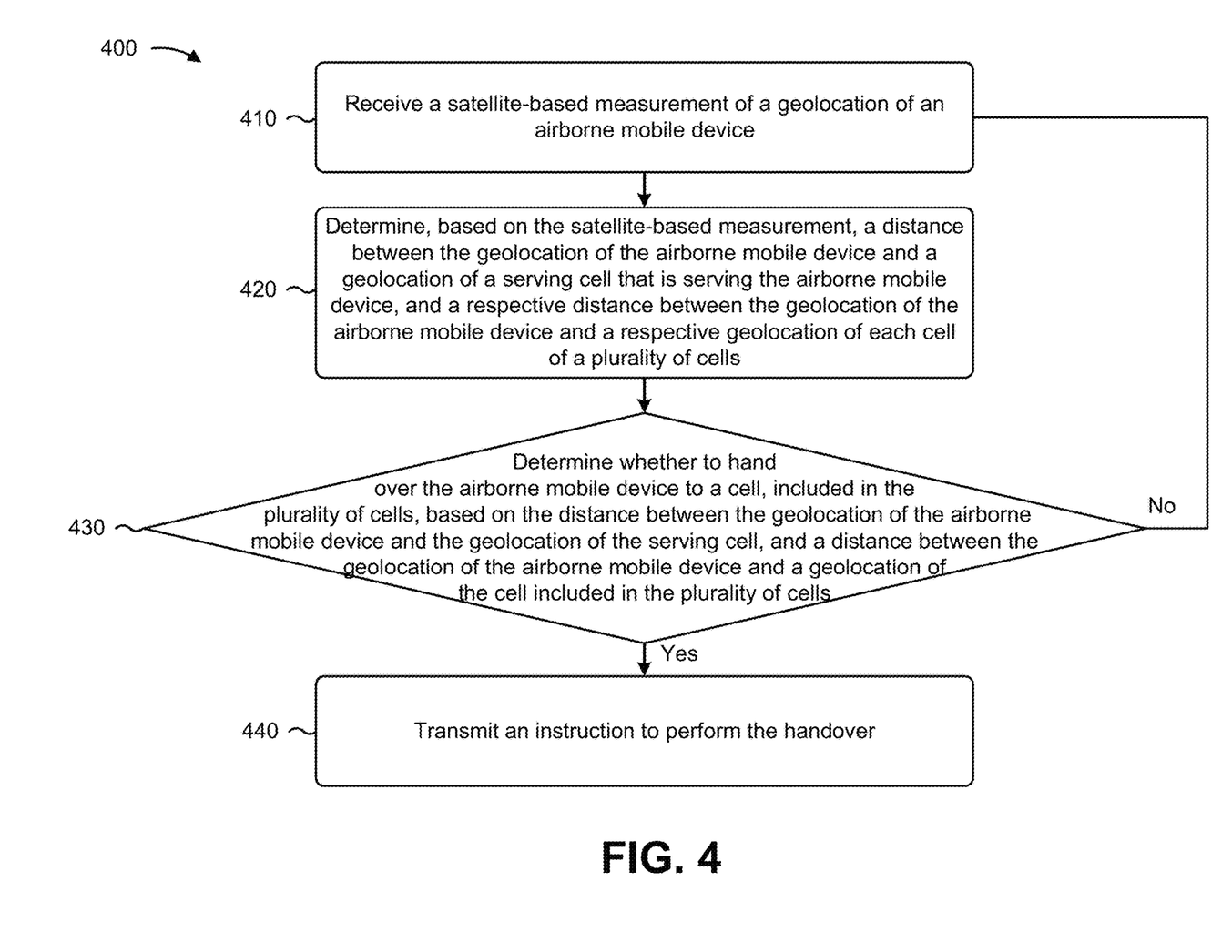
FIG. 4 is a flow chart of an example process for mobility management for airborne mobile devices.

FIG. 4 is a flow chart of an example process 400 for mobility management for airborne mobile devices. In some implementations, one or more process blocks of FIG. 4 can be performed by a RAN mobility management element (e.g., RAN mobility management element 220). In some implementations, one or more process blocks of FIG. 4 can be performed by another device or a group of devices separate from or including the RAN mobility management element, such as an airborne mobile device (e.g., airborne mobile device 205), a positioning satellite (e.g., positioning satellite 210), one or more cells (e.g., cells 215), one or more network function devices (e.g., network function devices 225), and/or the like.

As shown in FIG. 4, process 400 can include receiving a satellite-based measurement of a geolocation of an airborne mobile device (block 410). For example, the RAN mobility management element (e.g., using processor 320, memory 330, storage component 340, input component 350, communication interface 370, and/or the like) can receive a satellite-based measurement of a geolocation of an airborne mobile device, as described above.

As further shown in FIG. 4, process 400 can include determining, based on the satellite-based measurement, a distance between the geolocation of the airborne mobile device and a geolocation of a serving cell that is serving the airborne mobile device, and a respective distance between the geolocation of the airborne mobile device and a respective geolocation of each cell of a plurality of cells (block 420). For example, the RAN mobility management element (e.g., using processor 320, memory 330, storage component 340, input component 350, output component 360, communication interface 370, and/or the like) can determine, based on the satellite-based measurement, a distance between the geolocation of the airborne mobile device and a geolocation of a serving cell that is serving the airborne mobile device, and a respective distance between the geolocation of the airborne mobile device and a respective geolocation of each cell of a plurality of cells, as described above.

As further shown in FIG. 4, process 400 can include determining whether to hand over the airborne mobile device to a cell, included in the plurality of cells, based on the distance between the geolocation of the airborne mobile device and the geolocation of the serving cell, and a distance between the geolocation of the airborne mobile device and a geolocation of the cell included in the plurality of cells (block 430). For example, the RAN mobility management element (e.g., using processor 320, memory 330, storage component 340, input component 350, output component 360, communication interface 370, and/or the like) can determine whether to hand over the airborne mobile device to a cell, included in the plurality of cells, based on the distance between the geolocation of the airborne mobile device and the geolocation of the serving cell, and a distance between the geolocation of the airborne mobile device and a geolocation of the cell included in the plurality of cells, as described above.

As further shown in FIG. 4, if the RAN mobility management element determines to hand over the airborne mobile device (block 430-Yes), process 400 can include transmitting, to the cell and the serving cell, an instruction to perform the handover (block 440). For example, the RAN mobility management element (e.g., using processor 320, memory 330, storage component 340, input component 350, output component 360, communication interface 370, and/or the like) can transmit, to the cell and the serving cell, an instruction to perform the handover, as described above.

As further shown in FIG. 4, if the RAN mobility management element determines not to hand over the airborne mobile device (block 430-No), process 400 can return to block 410, where the RAN mobility management element can continue to receive satellite-based measurements of a geolocation of an airborne mobile device to determine whether to hand over the airborne mobile device to another cell.

Process 400 can include additional implementations, such as any single implementation or any combination of implementations described below and/or in connection with one or more other processes described elsewhere herein.

In some implementations, when determining whether to hand over the airborne mobile device to the cell included in the plurality of cells, the RAN mobility management element can determine whether the distance between the geolocation of the airborne mobile device and the geolocation of the serving cell is greater than the distance between the geolocation of the airborne mobile device and the geolocation of the cell included in the plurality of cells, and can determine to hand over the airborne mobile device to the cell, included in the plurality of cells adjacent to the serving cell, based on determining that the distance between the geolocation of the airborne mobile device and the geolocation of the serving cell is greater than the distance between the geolocation of the airborne mobile device and the geolocation of the cell included in the plurality of cells, or can determine not to hand over the airborne mobile device to the cell, included in the plurality of cells adjacent to the serving cell, based on determining that the distance between the geolocation of the airborne mobile device and the geolocation of the serving cell is not greater than the distance between the geolocation of the airborne mobile device and the geolocation of the cell included in the plurality of cells.

In some implementations, the RAN mobility management element can determine, based on a plurality of historical satellite-based measurements of the geolocation of the airborne mobile device, a direction of movement of the airborne mobile device, and when determining whether to hand over the airborne mobile device to the cell included in the plurality of cells, can determine, based on the direction of movement of the airborne mobile device, whether to hand over the airborne mobile device to the cell included in the plurality of cells. In some implementations, the RAN mobility management element can determine, based on a plurality of historical satellite-based measurements of the geolocation of the airborne mobile device, a velocity of movement of the airborne mobile device, and when determining whether to hand over the airborne mobile device to the cell included in the plurality of cells, can determine, based on the velocity of movement of the airborne mobile device, whether to hand over the airborne mobile device to the cell included in the plurality of cells.

In some implementations, the RAN mobility management element can receive a signal measurement associated with a wireless communication link between the airborne mobile device and the serving cell, can receive a signal measurement associated with a wireless communication link between the airborne mobile device and the cell included in the plurality of cells, and when determining whether to hand over the airborne mobile device to the cell included in the plurality of cells, can determine whether to hand over the airborne mobile device to the cell, included in the plurality of cells, based on the signal measurement associated with the wireless communication link between the airborne mobile device and the serving cell and the signal measurement associated with the wireless communication link between the airborne mobile device and the cell included in the plurality of cells.

In some implementations, the RAN mobility management element can determine the plurality of cells based on the plurality of cells being geolocated within a threshold distance of the geolocation of the airborne mobile device. In some implementations, the RAN mobility management element can determine the plurality of cells based on the plurality of cells being cells that are adjacent to the serving cell.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, at a radio access network (RAN) mobility management element, a satellite-based measurement of a geolocation of an airborne mobile device and signal measurements associated with each cell of a plurality of cells,
      wherein the airborne mobile device is operating at a height above local clutter, and
      wherein the airborne mobile device experiences signal strength levels that satisfy a particular threshold that indicates high signal strength with each cell of the plurality of cells;
   determining, by the RAN mobility management element and based on the satellite-based measurement:
      a distance between the geolocation of the airborne mobile device and a geolocation of a serving cell that is serving the airborne mobile device, and
      a respective distance between the geolocation of the airborne mobile device and a respective geolocation of each cell of the plurality of cells; and
   determining, by the RAN mobility management element, whether to hand over the airborne mobile device to a cell, included in the plurality of cells, based on:
      the distance between the geolocation of the airborne mobile device and the geolocation of the serving cell, and
      a distance between the geolocation of the airborne mobile device and a geolocation of the cell included in the plurality of cells.

2. The method of claim 1, wherein determining whether to hand over the airborne mobile device to the cell included in the plurality of cells comprises:
   determining whether the distance between the geolocation of the airborne mobile device and the geolocation of the serving cell is greater than the distance between the geolocation of the airborne mobile device and the geolocation of the cell included in the plurality of cells; and
   determining to hand over the airborne mobile device to the cell, included in the plurality of cells adjacent to the serving cell, based on determining that the distance between the geolocation of the airborne mobile device and the geolocation of the serving cell is greater than the distance between the geolocation of the airborne mobile device and the geolocation of the cell included in the plurality of cells, or
   determining not to hand over the airborne mobile device to the cell, included in the plurality of cells adjacent to the serving cell, based on determining that the distance between the geolocation of the airborne mobile device and the geolocation of the serving cell is not greater than the distance between the geolocation of the airborne mobile device and the geolocation of the cell included in the plurality of cells.

3. The method of claim 1, further comprising:
   determining, based on a plurality of historical satellite-based measurements of the geolocation of the airborne mobile device, a direction of movement of the airborne mobile device,
      wherein determining whether to hand over the airborne mobile device to the cell included in the plurality of cells comprises:
         determining, based on the direction of movement of the airborne mobile device, whether to hand over the airborne mobile device to the cell included in the plurality of cells.

4. The method of claim 1, further comprising:
   determining, based on a plurality of historical satellite-based measurements of the geolocation of the airborne mobile device, a velocity of movement of the airborne mobile device,
      wherein determining whether to hand over the airborne mobile device to the cell included in the plurality of cells comprises:
         determining, based on the velocity of movement of the airborne mobile device, whether to hand over the airborne mobile device to the cell included in the plurality of cells.

5. The method of claim 1, further comprising:
   receiving a signal measurement associated with a wireless communication link between the airborne mobile device and the serving cell; and
   receiving a signal measurement associated with a wireless communication link between the airborne mobile device and the cell included in the plurality of cells,
      wherein determining whether to hand over the airborne mobile device to the cell included in the plurality of cells comprises:
         determining whether to hand over the airborne mobile device to the cell, included in the plurality of cells, based on:
            the signal measurement associated with the wireless communication link between the airborne mobile device and the serving cell, and
            the signal measurement associated with the wireless communication link between the airborne mobile device and the cell included in the plurality of cells.

6. The method of claim 1, further comprising:
   determining the plurality of cells based on the plurality of cells being geolocated within a threshold distance of the geolocation of the airborne mobile device.

7. The method of claim 1, further comprising:
determining the plurality of cells based on the plurality of cells being cells that are adjacent to the serving cell.

8. A radio access network (RAN) mobility management element, comprising:
one or more memories; and
one or more processors, communicatively coupled to the one or more memories, to:
receive a satellite-based measurement of a geolocation of an airborne mobile device and signal measurements associated with each cell of a plurality of cells,
wherein the airborne mobile device is operating at a height above local clutter, and
wherein the airborne mobile device experiences signal strength levels that satisfy a particular threshold that indicates high signal strength with each cell of the plurality of cells;
determine, based on the satellite-based measurement:
a distance between the geolocation of the airborne mobile device and a geolocation of a serve cell that is serving the airborne mobile device, and
a respective distance between the geolocation of the airborne mobile device and a respective geolocation of each cell of the plurality of cells; and
determine whether to hand over the airborne mobile device to a cell, included in the plurality of cells, based on:
the distance between the geolocation of the airborne mobile device and the geolocation of the serving cell, and
a distance between the geolocation of the airborne mobile device and a geolocation of the cell included in the plurality of cells.

9. The RAN mobility management element of claim 8, wherein the one or more processors, when determining whether to hand over the airborne mobile device to the cell included in the plurality of cells, are to:
determine whether the distance between the geolocation of the airborne mobile device and the geolocation of the serving cell is greater than the distance between the geolocation of the airborne mobile device and the geolocation of the cell included in the plurality of cells; and
determine to hand over the airborne mobile device to the cell, included in the plurality of cells adjacent to the serving cell, based on determining that the distance between the geolocation of the airborne mobile device and the geolocation of the serving cell is greater than the distance between the geolocation of the airborne mobile device and the geolocation of the cell included in the plurality of cells, or
determine not to hand over the airborne mobile device to the cell, included in the plurality of cells adjacent to the serving cell, based on determining that the distance between the geolocation of the airborne mobile device and the geolocation of the serving cell is not greater than the distance between the geolocation of the airborne mobile device and the geolocation of the cell included in the plurality of cells.

10. The RAN mobility management element of claim 8, wherein the one or more processors are further to:
determine, based on a plurality of historical satellite-based measurements of the geolocation of the airborne mobile device, a direction of movement of the airborne mobile device,
wherein the one or more processors, when determining whether to hand over the airborne mobile device to the cell included in the plurality of cells, are to:
determine, based on the direction of movement of the airborne mobile device, whether to hand over the airborne mobile device to the cell included in the plurality of cells.

11. The RAN mobility management element of claim 8, wherein the one or more processors are further to:
determine, based on a plurality of historical satellite-based measurements of the geolocation of the airborne mobile device, a velocity of movement of the airborne mobile device,
wherein the one or more processors, when determining whether to hand over the airborne mobile device to the cell included in the plurality of cells, are to:
determine, based on the velocity of movement of the airborne mobile device, whether to hand over the airborne mobile device to the cell included in the plurality of cells.

12. The RAN mobility management element of claim 8, wherein the one or more processors are further to:
receive a signal measurement associated with a wireless communication link between the airborne mobile device and the serving cell; and
receive a signal measurement associated with a wireless communication link between the airborne mobile device and the cell included in the plurality of cells,
wherein the one or more processors, when determining whether to hand over the airborne mobile device to the cell included in the plurality of cells, are to:
determine whether to hand over the airborne mobile device to the cell, included in the plurality of cells, based on:
the signal measurement associated with the wireless communication link between the airborne mobile device and the serving cell, and
the signal measurement associated with the wireless communication link between the airborne mobile device and the cell included in the plurality of cells.

13. The RAN mobility management element of claim 8, wherein the one or more processors are further to:
determine the plurality of cells based on the plurality of cells being geolocated within a threshold distance of the geolocation of the airborne mobile device.

14. The RAN mobility management element of claim 8, wherein the one or more processors are further to:
determine the plurality of cells based on the plurality of cells being cells that are adjacent to the serving cell.

15. A non-transitory computer-readable medium storing instructions, the instructions comprising:
one or more instructions that, when executed by one or more processors of a radio access network (RAN) mobility management element, cause the one or more processors to:
receive a satellite-based measurement of a geolocation of an airborne mobile device and signal measurements associated with each cell of a plurality of cells,
wherein the airborne mobile device is operating at a height above local clutter, and
wherein the airborne mobile device experiences signal strength levels that satisfy a particular threshold that indicates high signal strength with each cell of the plurality of cells;
determine, based on the satellite-based measurement:

a distance between the geolocation of the airborne mobile device and a geolocation of a serve cell that is serving the airborne mobile device, and a respective distance between the geolocation of the airborne mobile device and a respective geolocation of each cell of the plurality of cells; and determine whether to hand over the airborne mobile device to a cell, included in the plurality of cells, based on:

the distance between the geolocation of the airborne mobile device and the geolocation of the serving cell, and a distance between the geolocation of the airborne mobile device and a geolocation of the cell included in the plurality of cells.

16. The non-transitory computer-readable medium of claim 15, wherein the one or more instructions, that cause the one or more processors to determine whether to hand over the airborne mobile device to the cell included in the plurality of cells, cause the one or more processors to:

determine whether the distance between the geolocation of the airborne mobile device and the geolocation of the serving cell is greater than the distance between the geolocation of the airborne mobile device and the geolocation of the cell included in the plurality of cells; and determine to hand over the airborne mobile device to the cell, included in the plurality of cells adjacent to the serving cell, based on determining that the distance between the geolocation of the airborne mobile device and the geolocation of the serving cell is greater than the distance between the geolocation of the airborne mobile device and the geolocation of the cell included in the plurality of cells, or determine not to hand over the airborne mobile device to the cell, included in the plurality of cells adjacent to the serving cell, based on determining that the distance between the geolocation of the airborne mobile device and the geolocation of the serving cell is not greater than the distance between the geolocation of the airborne mobile device and the geolocation of the cell included in the plurality of cells.

17. The non-transitory computer-readable medium of claim 15, wherein the one or more instructions, when executed by the one or more processors, further cause the one or more processors to:

determine, based on a plurality of historical satellite-based measurements of the geolocation of the airborne mobile device, a direction of movement of the airborne mobile device, wherein the one or more instructions, that cause the one or more processors to determine whether to hand over the airborne mobile device to the cell included in the plurality of cells, cause the one or more processors to:

determine, based on the direction of movement of the airborne mobile device, whether to hand over the airborne mobile device to the cell included in the plurality of cells.

18. The non-transitory computer-readable medium of claim 15, wherein the one or more instructions, when executed by the one or more processors, further cause the one or more processors to:

determine, based on a plurality of historical satellite-based measurements of the geolocation of the airborne mobile device, a velocity of movement of the airborne mobile device, wherein the one or more instructions, that cause the one or more processors to determine whether to hand over the airborne mobile device to the cell included in the plurality of cells, cause the one or more processors to:

determine, based on the velocity of movement of the airborne mobile device, whether to hand over the airborne mobile device to the cell included in the plurality of cells.

19. The non-transitory computer-readable medium of claim 15, wherein the one or more instructions, when executed by the one or more processors, further cause the one or more processors to:

receive a signal measurement associated with a wireless communication link between the airborne mobile device and the serving cell; and receive a signal measurement associated with a wireless communication link between the airborne mobile device and the cell included in the plurality of cells, wherein the one or more instructions, that cause the one or more processors to determine whether to hand over the airborne mobile device to the cell included in the plurality of cells, cause the one or more processors to:

determine whether to hand over the airborne mobile device to the cell, included in the plurality of cells, based on:

the signal measurement associated with the wireless communication link between the airborne mobile device and the serving cell, and the signal measurement associated with the wireless communication link between the airborne mobile device and the cell included in the plurality of cells.

20. The non-transitory computer-readable medium of claim 15, wherein the one or more instructions, when executed by the one or more processors, further cause the one or more processors to:

determine the plurality of cells based on the plurality of cells being geolocated within a threshold distance of the geolocation of the airborne mobile device.

* * * * *